Dec. 2, 1924.

C. V. FITE 1,517,552

FRICTION TRANSMISSION FOR AUTOMOBILES

Filed May 16, 1921     3 Sheets-Sheet 1

Inventor
C. V. Fite
By Lester L. Sargent
Attorney

Fig. 2.

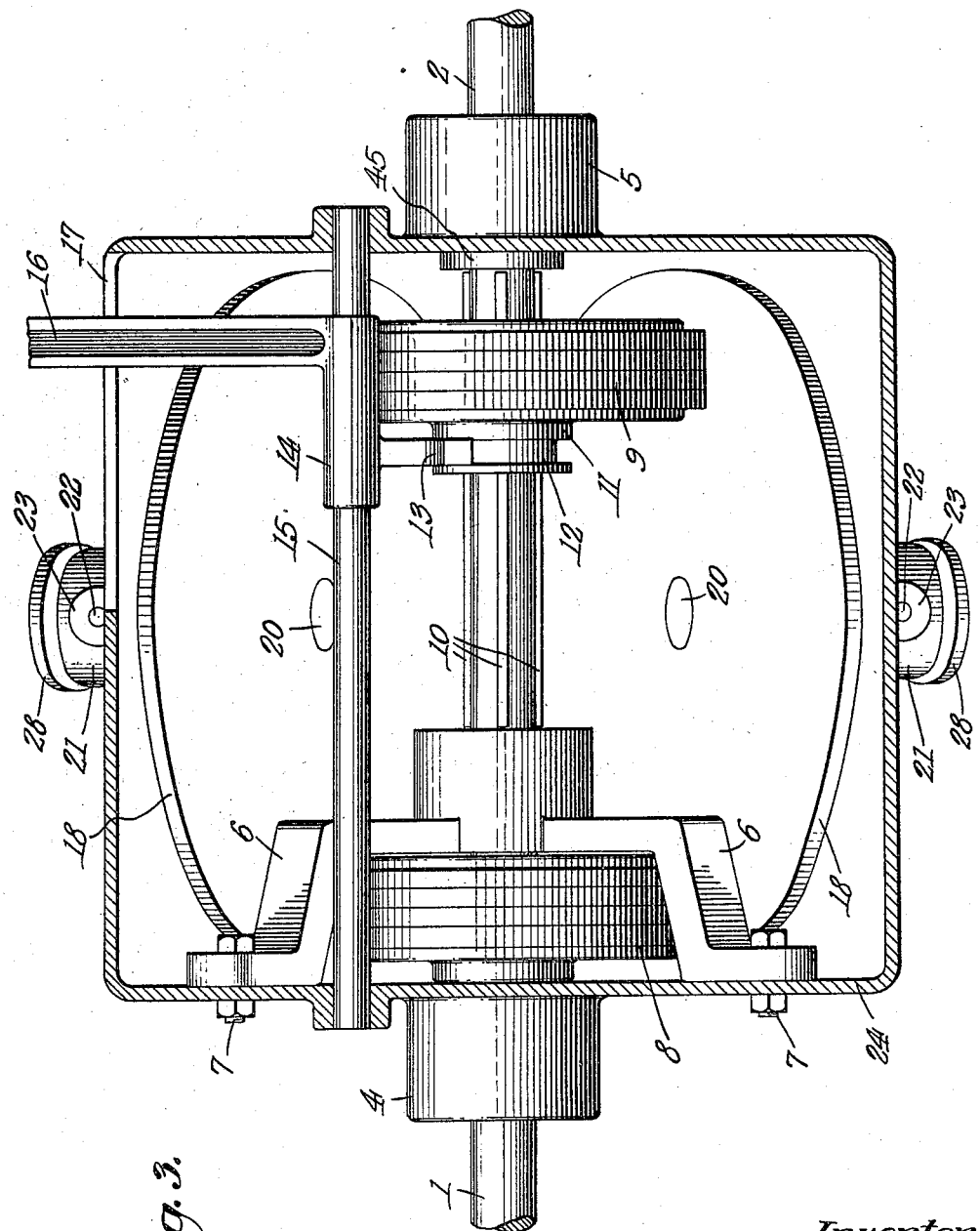

Patented Dec. 2, 1924.

1,517,552

UNITED STATES PATENT OFFICE.

CEPHAS V. FITE, OF CHARLOTTE, NORTH CAROLINA; MRS. EUNICE L. FITE ADMINISTRATRIX OF SAID CEPHAS V. FITE, DECEASED.

FRICTION TRANSMISSION FOR AUTOMOBILES.

Application filed May 16, 1921. Serial No. 469,962.

*To all whom it may concern:*

Be it known that I, CEPHAS V. FITE, a citizen of the United States, residing at Charlotte, in the county of Mecklenburg and State of North Carolina, have invented a new and useful Friction Transmission for Automobiles, of which the following is a specification.

The object of my invention is to provide a novel friction transmission for automobiles, which can be constructed at relatively small expense; which is highly efficient and which is provided with novel means for automatically adjusting the intermediate disks, to accommodate any difference in diameter of the driving and driven friction disks; to provide novel means for throwing the friction disks out of operation; and to provide convenient means for obtaining access to and assembling and disassembling the apparatus. I attain these and other objects of my invention by the mechanism illustrated in the accompanying drawings, in which—

Fig. 2 is a vertical cross section on line 2—2 of Fig. 1; and

Fig. 3 is a horizontal section on line 3—3 of Fig. 2.

Like numerals designate like parts in each of the several views.

Figure 1:
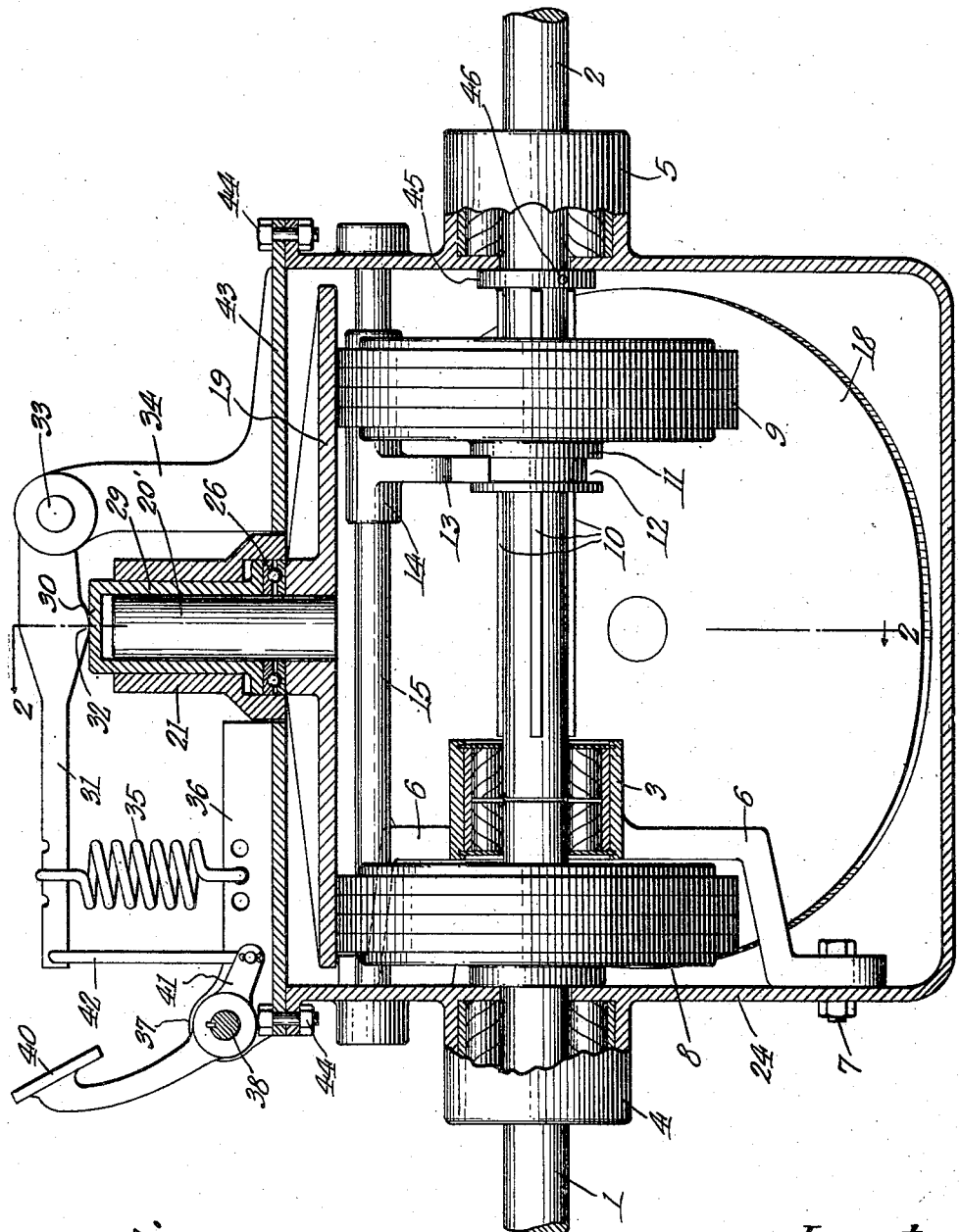
Figure 1 is a vertical longitudinal section of my device partly in side elevation.

Referring to the accompanying drawings, I provide a suitable drive shaft 1 and a suitable driven shaft 2, the ends of which shafts are positioned in proximity and mounted in suitable roller bearings 3. I also prefer to provide roller bearings 5 for driven shaft 2 and roller bearings 4 for the shaft 1, as illustrated. The roller bearings 3 are mounted on a suitable spider leg 6, which are secured by bolts 7 to the casing 24 which encloses the principal parts of the apparatus. I provide a friction disk 8 mounted on and affixed to the drive shaft, and rotating therewith. I also provide a slidable friction disk 9 slidably mounted on the portion of drive shaft 2 which is provided with splines 10 of any suitable number, which engage in slots in the disk member to prevent independent rotated movement of said disk relative to driven shaft 2. Integral with or affixed to the slidable friction disk 9 I provide a sleeve 11 having a groove 12 which is engaged by the yoke 13 of a shifting or slidable sleeve 14 which is slidably mounted on a suitable longitudinal shaft 15 that extends from end to end of the casing 24 and is mounted in said casing as shown in Fig. 1. The shifting sleeve 14 is provided with an operating lever 16 for slidably shifting the friction disk 9. Lever 16 projects through a slot 17 which extends longitudinally of casing 24, as illustrated in Figs. 2 and 3.

Figure 2:
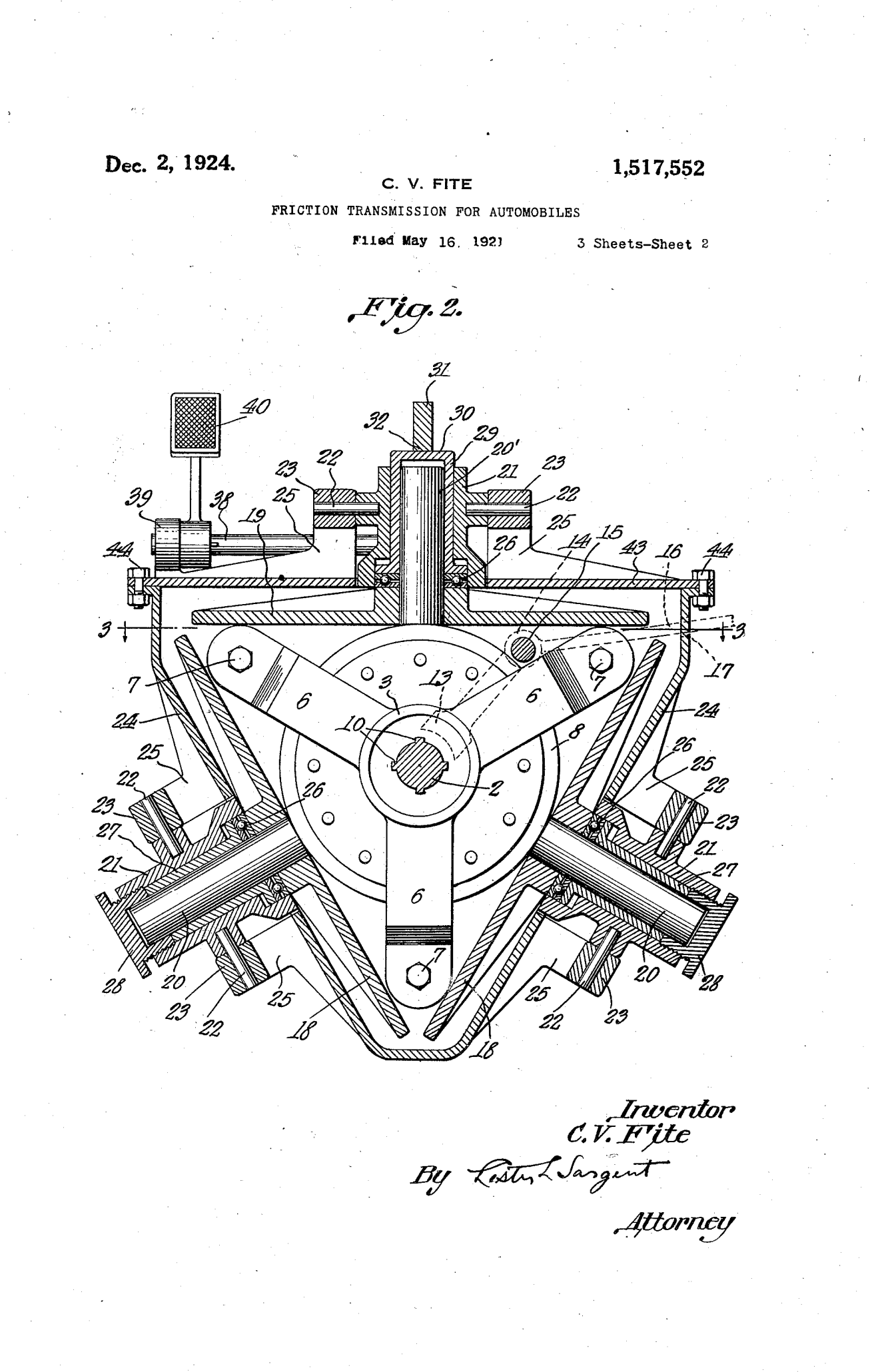

Referring to Fig. 2, I provide a plurality of intermediate disks 18, adjustably mounted in casing 24, and a manually adjustable or releasable intermediate disk 19, all of said disks normally frictionally engaging the friction disks 8 and 9 on the drive shaft 1 and the driven shaft 2, respectively. Intermediate disks 18 are mounted on stub shafts 20 and the manually releasable intermediate disk 19 is mounted on a like stub shaft 20'. I provide like bearings 21 for the respective stub shafts 20 and 20', as illustrated in Fig. 2, the bearings being pivotally mounted on a suitable pin 22 which is mounted in a suitable support or journal 23 which members are extensions of the web 25 of the casing 24, as shown in Fig. 2. I provide suitable ball bearings 26 on stub shafts 20. I also provide adjustable bushings 27 mounted for longitudinal movement in bearings 21. Said bushings are in contact with and adjustable by the threaded adjusting ends 28 which engage over the ends of stub shafts 20. I further provide a bushing 29 for stub shaft 20' said bushing having a closed end 30 for engagement with the cam portion 32 of a manually operated lever 31. As shown in Fig. 1 the lever 31 is mounted by pivot 33 and arm or support 34 on casing 24. I provide a suitable contractile spring 35 adjustably attached to lever 31 and web 36. I provide a link 42 connecting the end of lever 31 with the end of link 41, which in turn is keyed to a shaft 38 which is mounted on a suitable bearing 37. Shaft 38 also has a suitable lever 40 preferably foot operated and attached thereto, preferably at a position spaced from the link 41 for more convenient operation of the device by the foot of the driver.

The casing 24 which encloses the main portion of the apparatus, is substantially triangular in cross section and is provided with a suitable removable cover plate 43 which is attached to the rest of the casing by the bolts 44.

As shown in Fig. 1 I provide a suitable collar 45 affixed to the driven shaft 2 and adjacent to the casing 24 and fastened to the said shaft by a suitable pin or set screw 46, this collar functioning to prevent any longitudinal movement of the driven shaft 2 when the slidable friction disk is moved longitudinally of its shaft.

In operation power applied on drive shaft 1 and the friction disk 8 affixed to said shaft is transmitted to intermediate disks 18 and 19 which frictionally engage the periphery of disk 8 and is transmitted by said intermediate disks to the driven friction disk 9 which is mounted on and rotates the driven shaft 2 to which it is splined. When in the position shown in Fig. 1 the disk 9 is driven in a reverse direction from the drive shaft 1, but when shifted to the opposite side of the disk and in proximity to the disk 8 it rotates in the same direction with that disk and drives the driven shaft in a like direction. When the slidable friction disk 9 is moved to a position central of the intermediate disks 18 and 19 the transmission is set at neutral and no operation of the driven shaft results.

To insure effective transmission from disk 8 to disk 9 through the intermediate disks, regardless of any inequalities in the diameter or surface of the respective disks through wear or otherwise, the said intermediate disks are pivotally mounted on the pins 22 thus permitting of automatic adjustment of said disks to insure contact at all times with the peripheries of the disk 8 on the drive shaft 1 and the disk 9 of the driven shaft 2.

For the purpose of providing an emergency release I provide the foot operated lever 31 which is normally held in engagement with the bushing 29 of the stub shaft 20' on which intermediate disk 19 is mounted, but which may be released by operation of the foot lever 40 which functions to raise the lever 31 and thus permit the closed bushing 29, ball bearing 26 and the disk 29 in contact therewith to move outwardly and be released from operative engagement with the friction drive disk 8 and the friction driven disk 9 with which it is normally held in operative contact. Any suitable number or type of roller or ball bearings may be provided, the arrangement being preferably substantially as disclosed in the accompanying drawings, and particularly the bearing 4 would probably not be utilized if the device were built in on an engine.

What I claim is—

1. In a friction transmission for motor vehicles, the combination of a drive shaft, a driven shaft, said driven shaft having a longitudinally splined member, roller bearings in which the free ends of the drive shaft and the driven shaft are mounted, a friction disk affixed to the drive shaft, a second friction disk splined on the driven shaft but longitudinally slidable on said shaft, manually operated means for longitudinally moving said disk on the driven shaft, a plurality of adjustably mounted intermediate disks frictionally engaging the aforesaid friction disks, a third intermediate disk releasably engaging the said first named friction disks, resilient means bearing on said third intermediate disk to hold same in engagement with the first named friction disks under continuous pressure to operate as described, manually operated means for releasing the last named friction disks from operative contact with the friction disks on the drive shaft and driven shaft to permit slippage and thus throw the apparatus into inoperative position instantly, and manually operated means for longitudinally shifting friction disk on the driven shaft to any one of three positions relative to the intermediate disks to effect either a light rotation of the drive shaft and driven shaft, a reverse rotation, or a neutral relation.

2. In combination with the apparatus described in claim 1, a substantially triangular casing inclosing the above described intermediate disks, said casing including a removable cover member to permit of ready access to the interior, ball bearings on which the free ends of the drive shaft and driven shaft are mounted, and a spider supporting said bearings and mounted on the end wall of the aforesaid casing, substantially as shown.

3. In a friction transmission, the combination of a drive shaft, a driven shaft, a friction disk affixed to the drive shaft, a friction disk longitudinally slidable on the driven shaft but splined longitudinally on said shaft, intermediate disks in frictional contact with the aforesaid disks mounted on the drive shaft and the driven shaft and adapted to transmit power from one of said friction disks to the other to operate said disks in the desired direction, depending on the position of the friction disk that is slidable on the driven shaft relative to the intermediate disks with which it contacts, a casing of suitable shape to inclose all of the aforesaid disks, a shaft extending longitudinally of said casing and positioned beyond the periphery of the friction disks on the drive shaft and driven shaft, an arm slidable on said shaft and having a yoke operatively engaging the slidable friction disk to slide the same longitudinally, the casing having a longitudinal slot, a lever attached to the arm slidably mounted on the longitudinal shaft, said lever extending through the slot in the casing, and having operative connection with the slidable friction disc, means for adjustably mounting the intermediate disks, and means for releasing one of said disks from frictional contact with the disk which it normally engages, substantially as and for the purposes described.

4. In combination with a friction transmission mechanism having one or more intermediate discs, and adjustable mounting means for said discs, comprising a stub shaft to which the intermediate disc is affixed, a bearing in which said stub shaft is mounted, an adjustable bushing interposed between the bearing and the stub shaft, an adjustable nut engaging the adjustable bushing, said nut being threaded on the bearing, journal members on which the bearing is pivotally mounted to permit of a limited free tilting or swinging movement of the disc, substantially as set forth.

5. In a friction transmission for automobiles, the combination of a drive shaft, a driven shaft, a friction disk on the drive shaft, a friction disk on the driven shaft, intermediate disks frictionally engaging the friction disks on the drive shaft and the driven shaft, a third releasable intermediate disk similarly engaging the aforesaid friction disks on the shafts, resilient means bearing on said disk to hold the same under tension in engagement with the friction disks, said disk having a slidable mounting element, and a housing in which said element is slidably mounted.

6. In a friction transmission for automobiles, the combination of a drive shaft, a driven shaft, a friction disk on the drive shaft, a friction disk on the driven shaft, intermediate disks frictionally engaging the friction disks on the drive shaft and the driven shaft, a third releasable intermediate disk similarly engaging the aforesaid friction disks on the shafts, resilient means bearing on said disk to hold same under tension in operative engagement with the friction disks, said third intermediate disk having a slidable mounting element, and a housing in which said element is slidably mounted, journals arranged on opposite sides of the housings in which the several intermediate disks are mounted, pins in said journals, said pins extending into and pivotally supporting the respective housings, substantially as shown, to permit of automatic adjustment of the disks.

7. In a friction transmission for automobiles, the combination of a drive shaft having a friction drive shaft disk affixed thereto, a driven shaft having a friction disk longitudinally slidable thereon, the shaft having a plurality of splines engaging the disk, a trio of intermediate disks in normal frictional engagement with the friction disks on the shafts, one of said intermediate disks being manually releasable from engagement with the friction disks to release effective frictional engagement of the other intermediate disks with the friction disks on shifting of one of the friction disks to neutral position, or to a position for reverse operation, and resilient means normally holding said releasable intermediate disk in operative engagement under tension with the disks with which it contacts, and opposite pivotal mounting means for the shafts of each of the intermediate disks to permit of their automatic adjustment to make up for any inequalities in the surface or diameter of the friction disks.

8. In a friction transmission for automobiles, the combination of a drive shaft having a friction drive shaft disk affixed thereto, a driven shaft having a driven friction disk splined on said shaft but longitudinally slidable thereon, a plurality of intermediate disks with which both of the first named disks are in operative contact, the slidable disk being movable from a position at one side of the center of the disk to a position opposite thereto beyond the center of the disk, manually operated means for longitudinally sliding said driven friction disk on the driven shaft, whereby to rotate said shaft either with the drive shaft or in a reverse direction or to shift same to a neutral position at the center of the intermediate disks at will, means for pivotally mounting each of the intermediate disks whereby said disks will automatically adjust their positions to make up for any inequalities in the surface or diameter of the friction drive shaft and friction driven shaft disk, screw-threaded means for adjusting the frictional engagement of two of the intermediate disks with the drive shaft and driven shaft disks with which they contact, and resilient means for maintaining a sufficient and operative frictional engagement of the third intermediate disk with the drive-shaft and driven-shaft disks with which it contacts to operate as described.

CEPHAS V. FITE.